M. CHRISTOPHERSON.
CLEVIS.
APPLICATION FILED NOV. 6, 1914.

1,155,887.

Patented Oct. 5, 1915.

Inventor
Mansell Christopherson,

Witnesses

By Victor J. Evans
Attorney

UNITED STATES PATENT OFFICE.

MANSELL CHRISTOPHERSON, OF NEW EFFINGTON, SOUTH DAKOTA.

CLEVIS.

1,155,887.  Specification of Letters Patent.  Patented Oct. 5, 1915.

Application filed November 6, 1914. Serial No. 870,667.

*To all whom it may concern:*

Be it known that I, MANSELL CHRISTOPHERSON, a citizen of the United States, residing at New Effington, in the county of Roberts and State of South Dakota, have invented new and useful Improvements in Clevises, of which the following is a specification.

The invention relates to a clevis, and more particularly to the class of automatically releasing clevises for plows, engines or other draft farming implements.

The primary object of the invention is the provision of a clevis which is adaptable for use on a plow or other draft farming implement so that on the striking thereof upon a stone or other obstruction the same will be automatically released, thus obviating the possibility of the breaking of the plow or other implement, or the evener or draft gear.

Another object of the invention is the provision of a clevis of this character which can be readily attached to or detached from the plow or other farming implement, and also will permit the quick connection of a draft evener or a swingletree so that when using the plow or other farming implement the same will be automatically released should it contact with a stone or other obstruction during the use thereof, thereby freeing the same to prevent the breaking of the whiffletree, evener or plow, thus minimizing the chance of repairs which would otherwise result therefrom.

A further object of the invention is the provision of a clevis of this character which is extremely simple in construction, strong, durable, thoroughly reliable and efficient in its purpose, and inexpensive in manufacture.

With these and other objects in view, the invention consists in the construction, combination and arrangement of parts as will be hereinafter more fully described, illustrated in the accompanying drawing, and pointed out in the claim hereunto appended.

Figure 1:
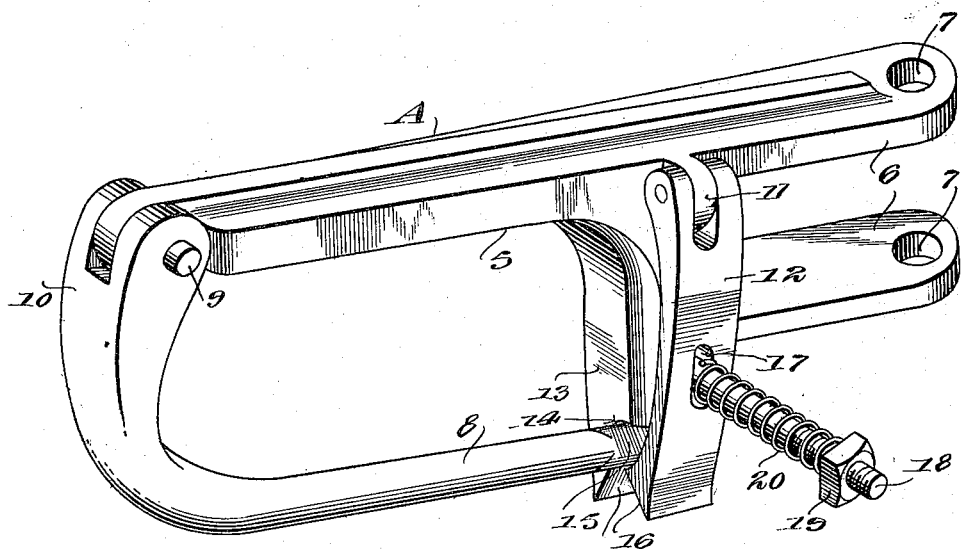
Figure 2:
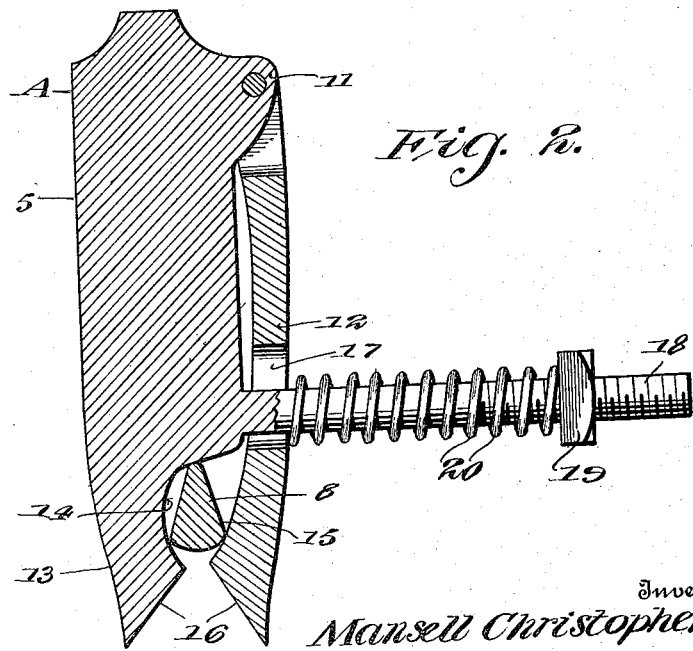

In the drawing:—Figure 1 is a perspective view of a clevis constructed in accordance with the invention. Fig. 2 is a vertical transverse sectional view through the clevis.

Similar reference characters indicate corresponding parts throughout the several views in the drawing.

Referring to the drawing in detail, the clevis comprises a casting A, preferably made from metal, forming a substantially L-shaped rigid frame portion 5 formed at the rearmost portion thereof with spaced parallel ears 6 provided with alining holes 7 adapted to detachably receive the coupling pin or the like whereby the clevis can be detachably fastened to the draft beam of a plow or other like farming implement. Swingingly connected to the forward end of the frame 5 is a releasing hook 8 which is supported upon a pivot 9 passed through the bifurcated end 10 of the said hook, and also through the forward end of the frame 5, and with this hook is adapted to engage the ring of the usual construction connected with the clevis on a whiffletree or draft evener, (not shown).

Formed on the frame 5 at one side thereof is a pintle eye 11 to which is pivotally connected a locking jaw 12, the latter coöperating with the portion 13 parallel therewith of the frame for the locking of the hook 8 in closed position. The portion 13 serves as a stationary jaw, while the jaw 12 is movable relative thereto, the jaw 13 being formed with a notch 14 serving as a seat for the hook 8 when closed, the free end of the hook being of triangular shape in cross section, as at 15, so as to serve as a wedge terminal for the separation of the jaw 12 from the jaw 13 on the closing of the hook, the jaws 12 and 13 being formed with beveled ends 16 against which works the wedge terminal of the hook when swung to closed position so that the free end of the hook will be locked between the jaws in the seat 14 for accommodating the same.

Formed in the jaw 12 is an elongated slot 17 through which is passed a stem 18 fixed in the jaw 13, and upon this stem is threaded a nut 19 against which works one end of a coiled expansion spring 20, the same surrounding the stem and having its opposite end playing against the jaw 12 to hold the same in normal position for locking the hook 8 closed. It will be apparent that by adjusting the nut 19, the tension of the spring 20 can be increased or decreased as the occasion may require.

On the connection of a whiffletree or evener with the clevis hereinbefore set forth, and in event of the plow or other like farming implement while under draft striking an obstruction such as a stone, the retarding of the draft of the said plow or other like implement will cause an excessive pull upon the hook 8, thereby causing it to be swung to open position and automatically released from between the jaws 12 and 13, thus freeing the plow or other like farming implement and the evener or whiffletree so as to avoid damage to either of the same.

From the foregoing description, taken in connection with the accompanying drawing, it is thought that the construction and manner of operation of the device will be clearly understood, and therefore a more extended explanation has been omitted.

What is claimed is:—

A clevis comprising a substantially L-shaped frame formed with spaced parallel ears for receiving a coupling pin, a releasing hook pivoted to the free end of the longer limb of the said frame and being of substantially triangular shape in cross section at its free end to provide a wedge terminal, a locking jaw pivotally mounted on the frame and coöperating with the shorter limb thereof for the clamping of the wedge terminal therebetween, the said shorter limb and jaw being formed with inwardly beveled ends to coöperate with the wedge terminal for the spreading of the said jaw on the entrance of the wedge terminal between it and the shorter limb of the frame, the said shorter limb being provided with a notch forming a seat for the wedge terminal, a guide stem integrally formed with the shorter limb of the frame and loosely passed through the jaw, and an adjustable tension element carried by the stem and working against the jaw to hold the same in clamping relation to the shorter limb of the frame.

In testimony whereof I affix my signature in presence of two witnesses.

MANSELL CHRISTOPHERSON.

Witnesses:
C. S. CORNELIUS,
E. A. CORNELIUS.

Copies of this patent may be obtained for five cents each, by addressing the "Commissioner of Patents, Washington, D. C."